Figure 9:
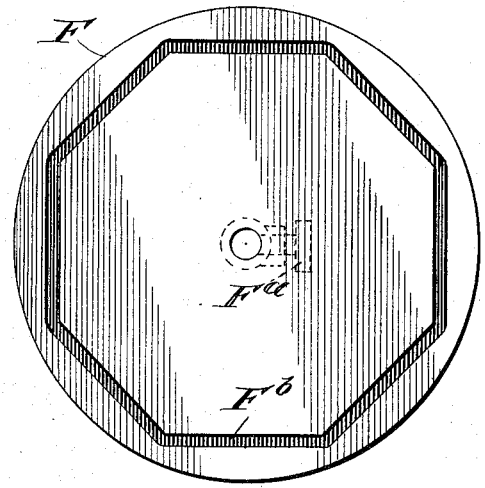

No. 881,899. PATENTED MAR. 17, 1908.
C. F. CHAPMAN.
IMPLEMENT FOR CUTTING SHAPED SECTIONS FROM GLASS SHEETS.
APPLICATION FILED JUNE 24, 1907.
2 SHEETS—SHEET 1.
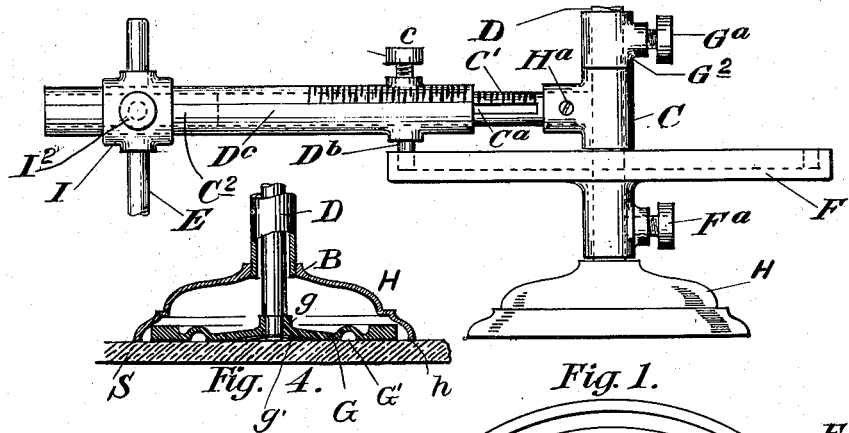
Fig. 4.   Fig. 1.
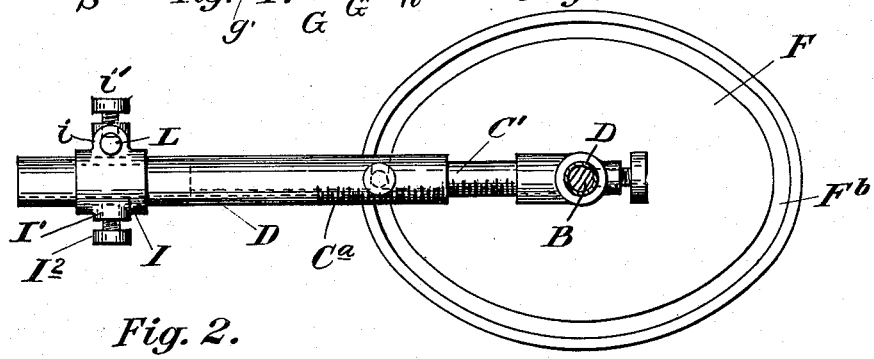
Fig. 2.
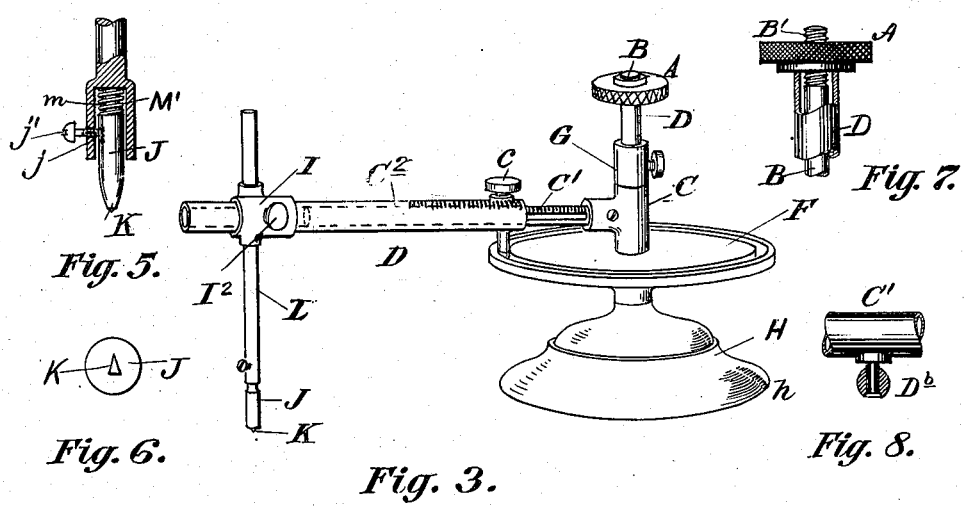
Fig. 5.   Fig. 7.
Fig. 6.   Fig. 8.
Fig. 3.
WITNESSES:   INVENTOR.
   Charles F. Chapman No. 881,899. PATENTED MAR. 17, 1908.
C. F. CHAPMAN.
IMPLEMENT FOR CUTTING SHAPED SECTIONS FROM GLASS SHEETS.
APPLICATION FILED JUNE 24, 1907.

2 SHEETS—SHEET 2.

Witnesses:
L. G. Ellis.
Chas. D. Swett.

Inventor:
Charles F. Chapman
by
C. A. Neale
his Atty.

UNITED STATES PATENT OFFICE.

CHARLES F. CHAPMAN, OF PHILADELPHIA, PENNSYLVANIA, ASSIGNOR TO HOTALING MANUFACTURING COMPANY, OF PHILADELPHIA, PENNSYLVANIA, A CORPORATION OF DELAWARE.

IMPLEMENT FOR CUTTING SHAPED SECTIONS FROM GLASS SHEETS.

No. 881,899.　　　　Specification of Letters Patent.　　　Patented March 17, 1908.

Application filed June 24, 1907.　Serial No. 380,603.

*To all whom it may concern:*

Be it known that I, CHARLES F. CHAPMAN, a citizen of the United States, residing in the city and county of Philadelphia, State of Pennsylvania, have invented a new and useful Improvement in Implements for Cutting Shaped Sections from Glass Sheets, of which the following is a specification.

This invention relates to machines or implements for cutting sections of circular, elliptical, or irregular outline from sheet or plate glass.

One object of the invention is to produce an implement that will quickly sever and detach from a body of sheet or plate glass a section of circular, elliptical or irregular outline.

A further object of the invention is an implement operable to sever and remove from a sheet of glass a section of circular, elliptical or irregular outline, leaving the glass sheet unbroken and intact, except for the detachment of said section.

Heretofore, so far as I am aware, implements of this character have not attained perfection in operation because the diamond would, in some part of the cutting of the outline, skip, so that the severed edges of the detached section and sheet of glass would have at one or more points of severance, points, fins, spurs or splinters, necessitating the dressing or grinding of the edges, especially if the disk or section cut out related to steam or other pressure gages, which is expensive, both as regards time in delivering goods, and the cost of skilled labor.

By my invention I have overcome the objections here noted, as by implements made in accordance with my invention now in practical use, a disk, section or part may be cut and removed from a sheet of glass, leaving the sheet intact or unbroken, except for the removal of said section, and the line of cleavage between said section and the sheet having the edges of both clean cut, not requiring grinding for fine work. This is of importance not only with the cutting of lenses and the like, but with the removal of a section in ornamental glass work and in the fitting of ventilators, when the tapping of the glass to cause a severance of the parts defined by the outline of the diamond is liable to cause cracks in the sheet to be used in a window, thus destroying the sheet, and wasting the work put upon it to that point.

My invention comprises an implement which in practical use avoids the objections hereinbefore noted, and consists in novel details of construction, and combinations to be described hereinafter in detail, and claimed in the closing clauses of this specification.

Figure 10:
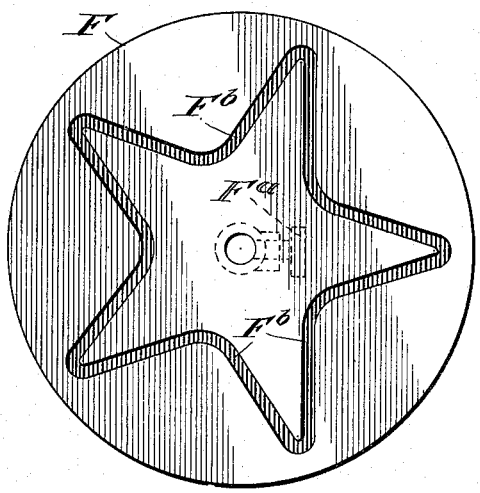
Figure 11:
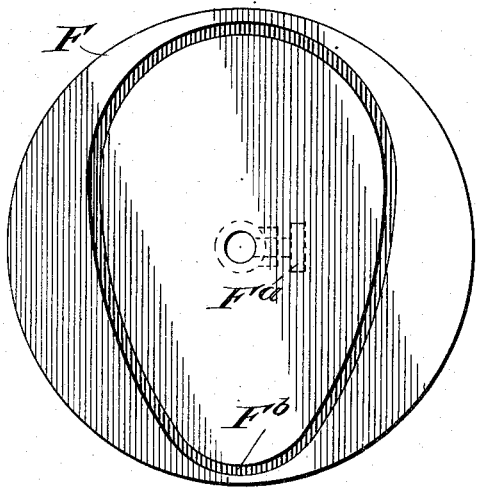

In the accompanying drawings, Figure 1 is a side elevation, of one form of device embodying my invention, the top of the standard being broken away. Fig. 2 is a plan view thereof, partly in section. Fig. 3 is a perspective view thereof. Fig. 4 is a vertical section through the base of the standard, and the suction disk. Fig. 5 is a detail, partly in section, of the lower end of the tool shank and tool. Fig. 6 is a bottom, plan view of the tool on a large scale. Fig. 7 is a detail, partly in section, showing the upper end of the standard and the operating rod and nut. Fig. 8 is a detail showing the ball pointed pin in section. Figs. 9, 10, and 11 are top plan views of some of the templets, that have been successfully used.

Referring to the drawings, a standard D rises from an arched or dome-shaped base H, and mounted to move freely about said standard without lost motion, is a sleeve C carrying a graduated arm C', carrying a telescopic sleeve C² on which is adjustably mounted a tool-carrying slide I, having a threaded boss I' to receive a thumb-screw I² by which the slide may be locked to the sleeve C² at a desired point. This slide is also provided with a boss $i$ having a vertical aperture to receive the shank L of the cutting tool, said shank being adjustably secured within the aperture by a thumb-screw $i'$, as shown.

As shown in Fig. 4, the standard is hollow throughout its length, and incloses a rod B passing through and secured at the radial center of a somewhat heavy rubber disk or diaphragm G of a diameter to be snugly seated within the down-curved margin $h$ of the arched or domed base H. As shown in Fig. 4, the lower end of the rod B is reduced in diameter and passes through a central boss $g$ of the suction disk or diaphragm G, and is further reduced at the extreme end to receive a thin steel washer $g'$ which is rigidly secured to the rod by upsetting or swaging the reduced end of the rod upon the washer, the parts being so proportioned that the washer will be embedded in the lower face of the disk in order that the latter may lie flat, or substantially so, upon a plane surface S, as, for instance, a sheet of glass.

The upper end of the rod is provided with a double thread B' or a thread of rapid pitch, engaging which is a thumb-nut A, by means of which the diaphragm G may be drawn upward at the center, thereby causing sufficient vacuum between the diaphragm and sheet of glass S to cause an adherence between the flat rim of the diaphragm and the glass, requiring great force to separate these parts.

A preferred form of cutter is shown in Figs. 5 & 6, comprising tool stock J formed of a small rod of brass provided at the lower end with a diamond K, and provided between its ends with a more or less wide transverse sawkerf or slot $j$, said tool-stock being inserted in a socket M' in the lower end of the toolshank, and a coiled spring $m'$ being interposed between the end of the tool-stock and bottom of the socket to exert a yielding cutting pressure upon the diamond. To successfully operate a device of this character, it is necessary that the lens or section cut and detached from the sheet, should have a greater diameter of severance on top or toward the tool, or, in other words, that the cleavage between the detached section and the sheet shall be at a slight bevel or angle from the top of the sheet of glass on which the tool is anchored, inward with respect to the line of the cut toward the center of the section of glass to be removed. This I accomplish with the preferred form of the cutter shown in Figs. 5 & 6, which is designed to represent a diamond point dressed to form cross-sectionally, an isosceles triangle a longer edge being designed to face the standard, the tool-stock J being swivelingly seated in the socket at the lower end of the toolshank, and a screw $j'$ passing through a tapped hole in the shank and entering the kerf $j$ of the stock, thus permitting limited axial movement of the stock, as also a limited vertical movement thereof, under pressure of the spring M' due to the kerf $j$ being somewhat wider than the diameter of the screw, limiting its vertical movement.

As so far described, the implement is limited to cutting circles and arcs, it will be understood that it is adapted to cutting sections of elliptical, oval or irregular form, according to the templet used. This, in the form shown, is accomplished by providing a pattern or templet F to be mounted on the standard beneath the tool-shank carrying arm C', and having a guide groove or way $F^b$ in its upper face to be engaged by a ball pointed swivel-pin $D^b$ depending from a sleeve C' mounted for free longitudinal movement on arm C' but held from rotation thereon by a longitudinal groove $C^a$ in the arm being engaged by a co-acting part carried by sleeve $C^2$, which may be a feather, or one or more studs passed through the walls of the sleeve and entering the groove of the arm. In this instance, the tool carrying sleeve I will be mounted adjustably on the sleeve $C^2$, the latter being provided with a longitudinal groove $D^c$ for engagement of the point of the thumb-screw $I^2$ to prevent rotation of the sleeve I on sleeve $C^2$.

It will be noted that the disk or diaphragm G is substantially flat throughout its diameter, its flat continuity being broken or interrupted by molding the disk to form a downwardly facing channel G' concentric with the periphery of the disk. This construction permits of the upward flexture of that part of the disk within the channel by the yielding of the walls of the arch defining the channel without disturbing the close contact of that part of the disk exterior to the channel with a glass sheet, thus rendering the hold of the disk to the glass very stable.

In operation, the parts are so proportioned that when the implement is placed upon a sheet of glass the margin $h$ of the base will be supported by the disk slightly above the glass, but upon turning the thumb-screw A to flex the disk upward at its center, the margin of the base will be moved nearer to the glass.

It will be understood that the implement though fitted with a templet F and the sliding sleeve $C^2$, may be used for cutting circles, by first reversing the set-screw $G^a$ of the keeper collar $G^2$, then raising the ball pointed swivel pin $D^b$ free from the guide groove of the templet, then sliding the sleeve $C^2$ outward until said pin is beyond the greatest diameter of the templet, then clamping said sleeve $C^2$ to arm C' by means of the set-screw $c$ and finally adjusting the tool-carrying slide to the desired position and locking it by means of screw $I^2$. Both arm C' and $C^2$ are provided with the scale as shown.

While, in the foregoing description I have assumed that the instrument is standing on a horizontal base, it will be understood that it may be operated in any other position, as, for instance, to cut a circular or irregular section from a pane of glass in a vertical sash, to admit of attaching a ventilator, or for ornamental purposes.

I claim:

1. An implement for cutting shaped sections from glass sheets, comprising an arched base, a substantially flat diaphragm therein, an arm mounted to move about the base as a center and adapted to carry a diamond, a rod rising from the center of the diaphragm through the base, and means to cause regulated upward movement of the rod.

2. An implement for cutting shaped sections from glass sheets comprising an arched base, a hollow standard rising therefrom, an arm secured to move about the standard as a center and carrying a diamond, a flat diaphragm within the base having an outwardly facing channel concentric with the periphery thereof, a rod rising from the center of the base through the standard, and means to cause regulated upward movement of the rod.

3. An implement for cutting shaped sections from glass sheets comprising an arched base, a hollow standard rising therefrom, an arm swiveled upon the standard and supporting a sliding sleeve carrying a tool support and tool, a grooved templet secured beneath the arm, a stud carried by the sliding sleeve engaging said groove, a flat diaphragm within the base, a rod secured centrally thereto and rising through the standard, and means to draw the rod upward to flex the diaphragm.

4. An implement for cutting shaped sections from glass sheets, comprising an arched base, a substantially flat diaphragm therein, an arm mounted to move about the base as a center and carrying a tool-shank, a rod rising from the center of the diaphragm through the base, and means to cause regulated upward movement of the rod, in combination with a tool-stock having limited swiveling movement in the shank and fitted with a diamond having a triangular face, the longer cutting edge of which is normally maintained facing the standard.

CHARLES F. CHAPMAN.

Witnesses:
E. B. MELRATH,
S. P. HOTALING.